(12) United States Patent
Hosoda et al.

(10) Patent No.: US 7,196,133 B2
(45) Date of Patent: Mar. 27, 2007

(54) SURFACE TENSION CONTROL AGENT FOR COATING MATERIAL AND COATING MATERIAL CONTAINING SAME

(75) Inventors: Motoe Hosoda, Nara (JP); Kazuhiro Miyake, Nara (JP); Hidehiro Ushio, Nara (JP)

(73) Assignee: Kyoeisha Chemical Co., Ltd., Osaka (JP)

( * ) Notice: Subject to any disclaimer, the term of this patent is extended or adjusted under 35 U.S.C. 154(b) by 0 days.

(21) Appl. No.: 10/561,218

(22) PCT Filed: Jul. 8, 2004

(86) PCT No.: PCT/JP2004/010083

§ 371 (c)(1),
(2), (4) Date: Jan. 5, 2006

(87) PCT Pub. No.: WO2005/003246

PCT Pub. Date: Jan. 13, 2005

(65) Prior Publication Data

US 2006/0167170 A1   Jul. 27, 2006

(30) Foreign Application Priority Data

Jul. 8, 2003   (JP) .............................. 2003-193576

(51) Int. Cl.
*C08L 27/12* (2006.01)
(52) U.S. Cl. ...................... 524/545; 526/242; 526/245; 525/276
(58) Field of Classification Search ................ 525/276, 525/288; 526/319, 242, 245; 524/599, 545
See application file for complete search history.

(56) References Cited

U.S. PATENT DOCUMENTS

| | | | | |
|---|---|---|---|---|
| 4,732,941 A | * | 3/1988 | Numa | 525/276 |
| 5,206,298 A | * | 4/1993 | Kawaguchi | 525/283 |
| 5,344,903 A | | 9/1994 | Raiford et al. | |
| 5,346,949 A | * | 9/1994 | Fukazawa | 524/805 |
| 5,700,576 A | * | 12/1997 | Brehm et al. | 428/412 |
| 5,798,406 A | * | 8/1998 | Feret et al. | 524/501 |
| 6,130,298 A | * | 10/2000 | Yamana et al. | 525/330.7 |
| 2002/0143087 A1 | | 10/2002 | Haubennestel et al. | |
| 2003/0105236 A1 | | 6/2003 | Hobisch et al. | |
| 2005/0004300 A1 | * | 1/2005 | Overbeek et al. | 524/502 |
| 2006/0058458 A1 | * | 3/2006 | Hasskerl et al. | 524/599 |

FOREIGN PATENT DOCUMENTS

| | | | |
|---|---|---|---|
| JP | A 03-030825 A | | 2/1991 |
| JP | A 05-192633 A | | 8/1993 |
| JP | A 09-255754 | | 9/1997 |
| JP | 10309455 A | * | 11/1998 |
| JP | 10309455 A1 | * | 11/1998 |
| JP | A 10-309455 A | | 11/1998 |

\* cited by examiner

*Primary Examiner*—David W. Wu
*Assistant Examiner*—Michael Bernshteyn
(74) *Attorney, Agent, or Firm*—Oliff & Berridge, PLC

(57) ABSTRACT

A surface tension control agent for coating materials includes a fluorine-containing (meth)acrylate copolymer obtained by copolymerizing a fluorine-substituted alkyl (meth)acrylate monomer (A), an alkyl (meth)acrylate monomer (B), and a hydroxyl group- or ether group-containing alkyl (meth)acrylate monomer (C), such that the ratio of (A) to {(B)+(C)} is 3–60 parts by weight to 40–97 parts by weight.

13 Claims, No Drawings

SURFACE TENSION CONTROL AGENT FOR COATING MATERIAL AND COATING MATERIAL CONTAINING SAME

TECHNICAL FIELD

The present invention relates to a surface tension control agent for coating materials for appropriately controlling a surface tension of a coated layer of the coating material, and a coating material containing the same.

BACKGROUND ART

When a coating material is coated on a surface of plastic articles, etc., such phenomena as color separation, remaining of foams, poor leveling, poor wetting etc. often occur. To prevent these phenomena, additives such as silicone resin etc., which decrease surface tension of the coated layer, have been beforehand added into the coating material.

Japanese Patent Provisional Publication No. 09-255754 discloses a silicone type polymer that is added, as a leveling agent and/or defoaming agent for paint into a cure type composition.

However, in this case, over-coatability onto a coated layer or anti-fouling property of the coated layer tends to be deteriorated when the surface tension of the coated layer is substantially lowered.

The present invention is made to solve the above mentioned problems. An object of the present invention is to provide a surface tension control agent for coating materials, which are used for suitably controlling a surface tension of a coated layer of the coating material and giving the coated layer an excellent over-coatability and/or anti-fouling property, and a coating material containing the same.

DISCLOSURE OF INVENTION

A surface tension control agent for coating materials of the present invention which was aimed at achieving the foregoing objects comprises a fluorine-containing (meth) acrylic type copolymer which is obtained by copolymerization of monomers consisting of: a fluorine-substituted alkyl (meth)acrylate monomer (A), an alkyl (meth)acrylate monomer having an alkyl group selected from the group consisting of lauryl and stearyl, or n-butyl acrylate monomer (B) and a hydroxyl group- or ether group-substituted alkyl (meth)acrylate monomer (C), wherein the ratio of (A) to {(B)+(C)} in the copolymer is in the range of 3~60 parts by weight to 40~97 parts by weight.

Similarly, a surface tension control agent for coating materials of the present invention comprises a fluorine-containing (meth)acrylate type copolymer that is obtained by copolymerization of the monomer (A), the monomer (B), the monomer (C) and at least one kind of vinyl monomer (D) selected from the group consisting of styrene, alkyl vinyl ether, alpha-olefin and maleic anhydride.

Preferably a weight-average molecular weight of the fluorine-containing (meth)acrylate type copolymer is in the range of 1,500–300,000. Under 1,500, properties of a coated layer become poor. On the contrary, over 300,000, viscosity of the coating material becomes too high, being difficult in handling.

The monomer (A) is an alkyl (meth)acrylate having a perfluoroalkyl group with 2–18 carbon atoms. More specifically trifluoroethyl methacrylate, tetrafluoropropyl methacrylate, perfluorooctyl ethyl methacrylate, and perfluorooctyl ethyl acrylate can be exemplified as the monomer (A).

The monomer (A) is preferably used in the range of 3–60 parts by weight in the copolymer. Below 3 parts by weight, surface tension of the coated layer becomes too high, being undesirable. Over 60 parts by weight, solubility thereof becomes poor, being difficult to prepare.

As the monomer (B), the alkyl (meth)acrylate monomer having the alkyl group selected from the group consisting of lauryl and stearyl, or n-butyl acrylate monomer, can be exemplified.

The monomer (C) is at least one kind of hydroxyl group- or ether group-containing alkyl (meth)acrylate represented by the following formula (1)

$$CH_2=C(R^1)-CO-O-A \qquad (1)$$

(where $R^1$ is hydrogen atom or methyl group; -A is a hydroxyl alkyl group with 2–4 carbon atoms or an alkyl substituent thereof, an alkyl monoalkylene glycol group having an alkyl group with 1–18 carbon atoms, an alkyl polyalkylene glycol group having an alkyl group with 1–18 carbon atoms, an alkenyl monoalkylene glycol group having an alkenyl group with 2–18 carbon atoms, or an alkenyl group-substituted polyalkylene glycol group having an alkenyl group with 2–18 carbon atoms).

For example, 2-hydroxyethyl acrylate, methoxy triethyleneglycol methacrylate, butoxyethyl methacrylate, 2-hydroxypropyl methacrylate, polyethylene glycol polypropylene glycol mono-methacrylate, polyethylene glycol polytetramethylene glycol mono-methacrylate can be exemplified as the monomer (C).

For example, styrene, straight- or branched-chain or cyclic alkylvinylether, alpha-olefin and maleic anhydride can be exemplified as the monomer (D). The monomer (D) is preferably used in the copolymer in the range of 1–40 parts by weight.

The present surface tension control agent for coating materials comprises, for example, the fluorine-containing (meth)acrylate type copolymer dissolved in an inactive solvent.

The inert solvent is preferably a solvent capable of dissolving the fluorine-containing (meth)acrylate type copolymer and miscible with the coating material etc. More specifically, an aromatic solvent such as xylene etc., a propylene glycol type solvent such as propylene glycol monomethyl ether etc., an alcohol type solvent such as 3-methyl-3-methoxy butanol etc. can be exemplified as such solvent. These solvents can be used alone or in combination.

The coating material of the present invention contains the surface tension control agent for coating materials of the present invention. The component of the coating material can include such ingredients, other than the surface tension control agent, as acrylic resin, polyester resin, urethane resin, alkyd resin, epoxy resin etc. or various reactive polymers, oligomers, or monomers. Acrylic resin is preferably used as such ingredient.

MODE FOR CARRYING OUT THE INVENTION

The fluorine-containing (meth)acrylate type copolymer, a component of the surface tension control agent for coating materials of the present invention, is obtained as follows. The copolymer is polymerized through random polymerization by adding the monomer (A), monomer (B), monomer (C) and monomer (D) dropwise into a solvent in the presence of a radical polymerization initiator under a heated condition. The copolymer can alternatively be obtained through block-copolymerization by adding monomer (A), (B), (C) and (D) separately into a solvent in the presence of a block-copolymerization initiator under a heated condition.

As the radical polymerization initiator, peroxide, azo compound etc., which are generally used in radical polymerization, can be used. More specifically, di-tert-butyl peroxide (PERBUTYL D; product by NOF CORPORATION), PERBUTYL O (product by NOF CORPORATION), PERTETRA A (product by NOF CORPORATION) etc. can be exemplified.

As the block-copolymerization initiator, a two-stage decomposing type initiator with two functional groups such as 1,1-bis-(tert-butyl peroxy)-2-methyl cyclohexane can be exemplified.

The surface tension control agent for coating materials of the present invention can be applied for both aqueous- and non-aqueous coating systems.

The coating material of the present invention is prepared by adding the surface tension control agent for coating materials of the present invention into a commonly used coating material which is prepared previously, and by mixing them. Solid content of 0.05–2.0% by weight preferably 0.1–1.0% by weight, of the surface tension control agent for coating materials is added, on the basis of the coating material, to the coating material. A coated layer having an appropriately adjusted surface tension is obtained from the thus prepared coating material.

(Application to Aqueous Coating Materials)

Examples of aqueous coating materials containing the surface tension control agent for coating materials of the present invention are shown in Examples 1 to 4. Comparative Examples of aqueous coating materials containing a surface tension coating agent for coating materials outside the present invention are shown in Comparative Examples 1 to 3.

EXAMPLE 1

150 parts by weight of 3-methyl-3-methoxy butanol (SOLFIT, product by KURARAY Co., Ltd.) was introduced into a vessel fitted with a reflux condenser, thermometer, stirrer and dropping funnel, and the liquid inside the vessel was kept at 120° C. A mixed solution of 5 parts by weight of trifluoroethyl methacrylate (LIGHT ESTER M-3F, product by KYOEISHA CHEMICAL Co., Ltd.), 47.5 parts by weight of methyl methacrylate, 47.5 parts by weight of 2-hydroxylethyl acrylate and 1 part by weight of PERBUTYL D (product by NOF CORPORATION) was dropwise added into SOLFIT under nitrogen over about 1 hour. Reaction was continued for 2 hours at 120° C., obtaining a solution containing fluorine-containing (meth)acryl type copolymer. Weight-average molecular weight of the thus obtained fluorine-containing (meth)acrylate type copolymer in the solution was determined using a gel-permeation chromatography. The molecular weight thereof was 11,000 in terms of polystyrene.

Next, 0.75 g of the thus obtained solution containing fluorine-containing (meth)acrylate type copolymer was added to 30 g of Water Base House Paint Emulsion Coating BLUE (product by ASAHIPEN CORPORATION) and 30 g of Water Base House Paint Emulsion Coating WHITE (product by ASAHIPEN CORPORATION). Then the mixture was mixed at a rotation speed of 3,000 rpm for 3 minutes using Labodisper, obtaining an aqueous type coating material.

EXAMPLE 2

150 parts by weight of SOLFIT (product by KURARAY Co., Ltd.) was introduced into a vessel fitted with a reflux condenser, thermometer, stirrer and dropping funnel, and the liquid inside the vessel was kept at 120° C. A mixed solution of 40 parts by weight of LIGHT ESTER M-3F (product by KYOEISHA CHEMICAL Co., Ltd.), 30 parts by weight of ethylhexyl methacrylate, 30 parts by weight of 2-hydroxyethyl acrylate and 1 part by weight of PERBUTYL D (product by NOF CORPORATION) was dropwise added into SOLFIT under nitrogen over about 1 hour. Reaction was continued for 2 hours at 120° C., obtaining a solution containing fluorine-containing (meth)acryl type copolymer. Weight-average molecular weight of the thus obtained fluorine-containing (meth)acryl type copolymer in the solution was determined using a gel-permeation chromatography. The molecular weight thereof was 35,000 in terms of polystyrene.

Then an aqueous type coating material was prepared according to Example 1 except that the thus obtained solution containing fluorine-containing (meth)acryl type copolymer was used instead of the solution containing the fluorine-containing (meth)acryl type copolymer in Example 1.

EXAMPLE 3

150 parts by weight of SOLFIT (product by KURARAY Co., Ltd.) was introduced into a vessel fitted with a reflux condenser, thermometer, stirrer and dropping funnel, and the liquid inside the vessel was kept at 120° C. A mixed solution of 15 parts by weight of LIGHT ESTER M-3F (product of KYOEISHA CHEMICAL Co., Ltd.), 30 parts by weight of butyl methacrylate, 55 parts by weight of 2-hydroxy ethylacrylate and 1 part by weight of PERBUTYL D (product by NOF CORPORATION) was dropwise added into SOLFIT under nitrogen over about 1 hour. Reaction was continued for 2 hours at 120° C., obtaining a solution containing fluorine-containing (meth)acryl-type copolymer. Weight-average molecular weight of the thus obtained fluorine-containing (meth)acryl type copolymer in the solution was determined using a gel-permeation chromatography. The molecular weight thereof was 15,000 in terms of polystyrene.

Then an aqueous type coating material was prepared according to Example 1 except that the thus obtained solution containing fluorine-containing (meth)acryl type copolymer was used instead of the solution containing the fluorine-containing (meth)acryl type copolymer in Example 1.

EXAMPLE 4

200 parts by weight of SOLFIT (product by KURARAY Co., Ltd.) was introduced into a vessel fitted with a reflux condenser, thermometer, stirrer and dropping funnel, and the liquid inside the vessel was kept at 110° C. A mixed solution of 20 parts by weight of perfluorooctyl ethyl methacrylate (LIGHT ESTER FM-108; product by KYOEISHA CHEMICAL Co., Ltd.), 15 parts by weight of n-butyl acrylate, 65 parts by weight of 2-hydroxyethyl acrylate and 5 parts by weight of PERBUTYL O (product by NOF CORPORATION) was dropwise added into SOLFIT under nitrogen over about 1 hour. Reaction was continued for 2 hours at 110° C., obtaining a solution containing fluorine-containing (meth)acryl type copolymer, Weight-average molecular weight of the thus obtained fluorine-containing (meth)acryl type copolymer in the solution was determined using a gel-permeation chromatography. The molecular weight thereof was 5,000 in terms of polystyrene.

Then 85 g of aqueous alkyd resin (Alorone 376; product by NIPPON SHOKUBAI Co., Ltd.) and 15 g of melamine resin (WATERSOL S695, product by DAINIPPON INK AND CHEMICALS, INCORPORATED) were mixed for 5 minutes at a rotation speed of 2,000 rpm using Labodisper. Then, into the mixed aqueous coating material, 0.1%, in terms of solid content, of the thus obtained solution containing fluorine-containing (meth)acryl type copolymer was added and then mixed at a rotation speed of 2,000 rpm for 5 minutes, obtaining an aqueous type coating material.

COMPARATIVE EXAMPLE 1

150 parts by weight of SOLFIT (product by KURARAY Co., Ltd.) was introduced into a vessel fitted with a reflux condenser, thermometer, stirrer and dropping funnel, and the liquid inside the vessel was kept at 120° C. A mixed solution of 80 parts by weight of LIGHT ESTER M-3F (product by KYOEISHA CHEMICAL Co., Ltd.), 10 parts by weight of methyl (meth)acrylate, 10 parts by weight of 2-hydroxyethyl acrylate and 1 part by weight of PERBUTYL D (product by NOF CORPORATION) was dropwise added into SOLFIT under nitrogen over about 1 hour. Reaction was continued for 2 hours at 120° C., but reaction product became insoluble in SOLFIT in the course of the reaction, being unable to obtain a solution containing fluorine-containing (meth)acryl type copolymer.

COMPARATIVE EXAMPLE 2

150 parts by weight of SOLFIT (product by KURARAY Co., Ltd.) was introduced into a vessel fitted with a reflux condenser, thermometer, stirrer and dropping funnel, and the liquid inside the vessel was kept at 120° C. A mixed solution of 50 parts by weight of methyl methacrylate, 50 parts by weight of 2-hydroxyethyl acrylate and 1 part by weight of PERBUTYL D (product by NOF CORPORATION) was dropwise added into SOLFIT under nitrogen over about 1 hour. Reaction was continued for 2 hours at 120° C., obtaining a solution containing (meth)acryl type copolymer. Weight-average molecular weight of the thus obtained (meth)acryl type copolymer in the solution was determined using a gel-permeation chromatography. The molecular weight thereof was 11,000 in terms of polystyrene.

Then an aqueous type coating material was prepared according to Example 1 except that the thus obtained solution containing (meth)acryl type copolymer was used instead of the solution containing fluorine-containing (meth) acryl type copolymer in Example 1.

COMPARATIVE EXAMPLE 3

200 parts by weight of SOLFIT (product by KURARAY Co., Ltd.) was introduced into a vessel fitted with a reflux condenser, thermometer, stirrer and dropping funnel, and the liquid inside the vessel was kept at 110° C. A mixed solution of 20 parts by weight of lauryl methacrylate, 15 parts by weight of n-butyl acrylate, 65 parts by weight of 2-hydroxyethyl acrylate and 5.0 parts by weight of PERBUTYL O (product by NOF CORPORATION) was dropwise added into SOLFIT under nitrogen over about 1 hour. Reaction was continued for 2 hours at 110° C., obtaining a solution containing fluorine-containing (meth)acryl type copolymer.

Weight-average molecular weight of the thus obtained fluorine-containing (meth)acryl type copolymer in the solution was determined using a gel-permeation chromatography. The molecular weight thereof was 7,000 in terms of polystyrene.

Then an aqueous type coating material was prepared according to Example 4 except that the thus obtained solution containing (meth)acryl type copolymer was used instead of the solution containing fluorine-containing (meth) acryl type copolymer in Example 4.

In order to investigate the physical properties of the aqueous type coating materials obtained in Examples 1 to 4 and Comparative Examples 1 to 3, measurement of surface tension of coated layers and coating materials, evaluation of color separation prevention ability, evaluation of deforming performance, evaluation of leveling ability, measurement of contact angles of coating materials, evaluation of wettability to a substrate, were executed.

(Measurement of Surface Tension of Coated Layers)

The coating material to be tested was applied on a test paper using 250·m applicator, then a standard fluid (formamide/ethylene glycol monoethyl ether) was coated using a cotton swab and then kept still for 2 seconds. Then the condition of the standard fluid coated on the test paper was observed.

As shown in Table 1, corresponding values for the standard fluids were used according to JIS K-6768 that prescribes a test method for wettability of polyethylene and polypropylene film, In the case where the shape of the standard fluid on the test paper remained unchanged after 2 seconds after the standard fluid was applied on the test paper, the same procedures were repeated using another standard liquid having higher surface tension. On the contrary, when shrinkage was observed as a whole in 2 seconds, the same procedures were repeated using another standard liquid having lower surface tension. Such repetition was carried out until the shape of the standard fluid remained unchanged in 2 seconds after applying the standard fluid, thus selecting a grade of standard fluid. The surface tension of the coated layer was determined according to the value of the surface tension given to the selected standard liquid.

TABLE 1

| Standard Liquid | Formamide (V/V %) | Ethylene glycol monoethyl ether (V/V %) | Surface Tension (•N/cm) |
|---|---|---|---|
| a | 26.5 | 73.5 | 34 |
| b | 35.0 | 65.0 | 35 |
| c | 42.5 | 57.5 | 36 |
| d | 48.5 | 51.5 | 37 |
| e | 54.0 | 46.0 | 38 |

(Measurement of Surface Tension of Coating Materials)

A ring was immersed in a coating material. Then the ring was moved upward at a speed of 0.5 mm/min., with membrane being formed on the ring. Surface tension of the membrane was measured using Dinometer (product by BIGCHEMIE).

(Evaluation of Color Separation Prevention Ability)

The coating material was applied on a test paper using a 250·m applicator and then kept still for 15 minutes. Rubbing was performed after the 15 minutes and then the test paper was dried over a night at room temperature. Color difference between the background and the rubbing portion was measured using Chroma Meter CR-200 (product by MINOLTA).

(Evaluation of Defoaming Performance)

A roller with half-long hair was immersed into a coating material to be evaluated. Then the coating material was applied on an aluminum board by rotating the roller. Defoaming phenomena was visually observed, that is, the period of time until foam disappeared from the coated portion was measured.

(Evaluation of Leveling Ability)

A coating material was applied on an aluminum board using a bar coater 50. Then existence or nonexistence of traces caused by the bar coater was visually observed.

(Measurement of Contact Angles of Coating Materials)

A droplet of about 4·L of the coating material was dropped onto a polytetrafluoroethylene (PTFE) board, and then a contact angle was measured using a contact-angle meter (product by KYOWA INTERFACE SCIENCE Co., Ltd.).

(Evaluation of Wettability to a Substrate)

A coating material was applied on a PTFE board using a 100·m applicator. Wettability to the PTFE board was visually evaluated.

In addition, a blank test and GLANOL test were carried out for comparison. As Blank A, a coating material was prepared according to Example 1 except that the solution containing fluorine-containing (meth)acryl type copolymer was not added. As GLANOL sample A, a coating material was prepared according to Example 1 except that GLANOL 400 (product by KYOEISHA CHEMICAL Co., Ltd.), which is a 100% polyether modified silicone, was used instead of the solution containing fluorine-containing (meth)acryl type copolymer. The Blank and GLANOL samples were subjected to such evaluations as measurement of surface tension of their coated layers and of the coating materials, evaluation of color separation prevention ability, defoaming performance and leveling ability.

A blank and POLYFLOW A tests were also carried out to evaluate wettability to substrates. As Blank B, a coating material was prepared according to Example 4 except that the solution containing fluorine-containing (meth)acryl type copolymer was not added. As POLYFLOW A sample, a coating material was prepared according to Example 4 except that POLYFLOW KL245 (product by KYOEISHA CHEMICAL Co., Ltd.), which is a 100% polyether modified silicone, was used instead of the solution containing fluorine-containing (meth)acryl type copolymer.

Blank B and POLYFLOW A samples were subjected to such evaluations as measurement of surface tension of their coated layers and of the coating materials, evaluation of contact angle of the coating materials and wettability to substrates.

Results are shown in Tables 2 to 6.

TABLE 2

| | Surface Tension (·N/cm) | |
| --- | --- | --- |
| | Coated Layer | Coating Material |
| Example 1 | 37 | 36.1 |
| Example 2 | 37 | 35.8 |
| Example 3 | 37 | 36.2 |
| Example 4 | 34 | 20.1 |
| Comp. Example 1 | — | — |
| Comp. Example 2 | 37 | 36.7 |
| Comp. Example 3 | 34 | 29.8 |
| Blank A | 37 | 36.7 |

TABLE 2-continued

| | Surface Tension (·N/cm) | |
| --- | --- | --- |
| | Coated Layer | Coating Material |
| Blank B | 34 | 31.5 |
| GLANOL A | 35 | 35.0 |
| POLYFLOW A | 32 | 29.8 |

TABLE 3

| | Color Separation Prevention Ability | | | |
| --- | --- | --- | --- | --- |
| | ·L | ·a | ·b | ·E |
| Example 1 | 0.22 | 0.03 | −0.19 | 0.29 |
| Blank A | −0.89 | −0.32 | −1.70 | 1.94 |

TABLE 4

| | Defoaming Ability (Time Period until Foam Disappears) |
| --- | --- |
| Example 2 | 13 seconds |
| Blank A | 300 seconds |

TABLE 5

| | Leveling Ability (Existence or Nonexistence of Traces Caused by Bar Coater) |
| --- | --- |
| Example 3 | Nonexistence |
| Blank A | Existence |

TABLE 6

| | Contact Angle of Coating Material on PTFE Board (°) | Wettability to Substrate |
| --- | --- | --- |
| Example 4 | 38.3 | wet |
| Comp. Example 3 | 61.2 | no wet |
| Blank B | 63.2 | no wet |
| POLYFLOW A | 55.2 | no wet |

As seen from Tables 2 to 6, surface tension of the coating materials of Examples 1 to 3 was lowered when compared with that of comparative Examples 1, 2 and Blank test. But surface tension of the coated layers was not lowered, and color separation prevention ability, defoaming ability and leveling ability thereof were improved.

The coating materials of Examples 1 to 3 have excellent properties as described above. However, in Examples 1 to 3, lowering in surface tension of the coated layers, which was observed for the coated layer of the GLANOL sample, was not observed.

Surface tension of the coating material in Example 4 was lowered when compared with Comparative Examples 3, Blank and POLYFLOW A samples, but surface tension of the coated layer thereof was not lowered. The contact angle of the coating material of Example 4 on the PTFE board was lowered, and wettability to substrates of the coating material of Example 4 was also improved.

(Application to Non-Aqueous Coating Materials)

Non-aqueous coating materials containing surface tension control agent for coating materials of the present invention are shown in Examples 5 to 8. And non-aqueous coating materials containing surface tension control agent for coating materials outside the scope of the present invention are shown in Comparative Examples 4 to 6.

EXAMPLE 5

150 parts by weight of xylene was introduced into a vessel fitted with a reflux condenser, thermometer, stirrer and dropping funnel, and the liquid inside the vessel was kept at 120° C. A mixed solution of 5 parts by weight of LIGHT ESTER M-3F (product by KYOEISHA CHEMICAL Co., Ltd.), 55 parts by weight of ethylhexyl methacrylate, 40 parts by weight of methoxy triethylene glycol methacrylate and 1 part by weight of PERBUTYL D (product by NOF CORPORATION) was dropwise added into xylene under nitrogen over about 1 hour. Reaction was continued for 2 hours at 120° C., obtaining a solution containing fluorine-containing (meth)acryl type copolymer. Weight-average molecular weight of the thus obtained fluorine-containing (meth)acryl type copolymer in the solution was determined using a gel-permeation chromatography. The molecular weight thereof was 11,000 in terms of polystyrene.

Next a main coating material (black) and a main coating material (white) were prepared as follows. 34 g of 50% non-volatile toluene-butyl acetate solution containing an acrylpolyol resin having a hydroxyl value of 50 (ACRYDIC A-801; product by DAINIPPON INK AND CHEMICALS, INCORPORATED), 4.5 g of carbon black (FW-200; product by DEGUSSA), 4.5 g of 30% non-volatile pigment-dispersing agent (FLOWLEN DOPA 17; product by KYOEISHA CHEMICAL Co., Ltd.), 19.0 g of thinner (xylene/butyl acetate=70/30) and 200 g of glass beads having a diameter of 1.5 to 2.0 mm were all introduced into a 225 ml glass bottle, and then mixed for 1 hour using a paint shaker. After 1 hour, 71.6 g of ACRYDIC A-801 was added and then the glass beads were let down and separated, thus obtaining the main coating material (black). Next, 20.5 g of ACRYDIC A-801, 25.8 g of titanium oxide (CR-93; product by ISHIHARA SANGYO KAISHA, Ltd.), 2.6 g of pigment-dispersing agent (FLOWLEN DOPA 17; product by KYOEISHA CHEMICAL Co., Ltd.), 11.6 g of thinner (xylene/butyl acetate=70/30) and 200 g of glass beads having a diameter of 1.5 to 2.0 mm were all introduced into a 225 ml glass bottle and then mixed for 1 hour using a paint shaker. After 1 hour, 71.1 g of ACRYDIC A-801 was added, and then the glass beads were let down and separated, thus obtaining the main coating material (white).

1.25 g of the fluorine-containing (meth)acryl type copolymer solution was added into a mixture of 15 g of the thus obtained main coating material (black) and 85 g of the thus obtained main coating material (white), and mixed for 3 minutes at a rotation speed of 3,000 rpm using Labodisper. To 100 g of the thus mixed coating material, 15.6 g of SUMIDULE N-75 (product by SUMITOMO BAYER URETHANE) was further added and mixed for 2 minutes at a rotation speed of 1,000 rpm, thus obtaining a non-aqueous coating material.

EXAMPLE 6

150 parts by weight of xylene was introduced into a vessel fitted with a reflux condenser, thermometer, stirrer and dropping funnel, and the liquid inside the vessel was kept at 120° C. A mixed solution of 40 parts by weight of LIGHT ESTER M-3F (KYOEISHA CHEMICAL Co., Ltd.), 50 parts by weight of lauryl methacrylate, 10 parts by weight of butoxy ethyl methacrylate and 1 part by weight of PERBUTYL D (product by NOF CORPORATION) was dropwise added into xylene under nitrogen over about 1 hour. Reaction was continued for 2 hours at 120° C., obtaining a solution containing fluorine-containing (meth)acryl type copolymer. Weight-average molecular weight of the thus obtained fluorine-containing (meth)acryl type copolymer in the solution was determined using a gel-permeation chromatography. The molecular weight thereof was 35,000 in terms of polystyrene.

Next, a non-aqueous coating material was prepared according to Example 5 except that the thus obtained solution containing fluorine-containing (meth)acryl type copolymer was used instead of the solution containing fluorine-containing (meth)acryl type copolymer in Example 5.

EXAMPLE 7

150 parts by weight of xylene was introduced into a vessel fitted with a reflux condenser, thermometer, stirrer and dropping funnel, and the liquid inside the vessel was kept at 120° C. A mixed solution of 15 parts by weight of LIGHT ESTER M-3F (product by KYOEISHA CHEMICAL Co., Ltd.), 35 parts by weight of ethyl hexyl methacrylate, 30 parts by weight of butoxyethyl methacrylate and 1 part by weight of PERBUTYL D (product by NOF CORPORATION) was dropwise added into xylene under nitrogen over about 1 hour. Reaction was continued for 2 hours at 120° C., obtaining a solution containing fluorine-containing (meth) acryl type copolymer. Weight-average molecular weight of the thus obtained fluorine-containing (meth)acryl type copolymer in the solution was determined using a gel-permeation chromatography. The molecular weight thereof was 35,000 in terms of polystyrene.

Next, a non-aqueous coating material was prepared according to Example 5 except that the thus obtained solution containing fluorine-containing (meth)acryl type copolymer was used instead of the solution containing fluorine-containing (meth)acryl type copolymer in Example 5.

EXAMPLE 8

200 parts by weight of xylene was introduced into a vessel fitted with a reflux condenser, thermometer, stirrer and dropping funnel, and the liquid inside the vessel was kept at 110° C. A mixed solution of 20 parts by weight of perfluorooctyl ethyl methacrylate (LIGHT ESTER FM-108; product by KYOEISHA CHEMICAL Co., Ltd.), 60 parts by weight of n-butylacrylate, 15 parts by weight of 2-hydroxyethyl acrylate and 5.0 parts by weight of PERBUTYL O (product by NOF CORPORATION) was dropwise added into xylene under nitrogen over about 1 hour. Reaction was continued for 2 hours at 110° C., obtaining a solution containing fluorine-containing (meth)acryl type copolymer. Weight-average molecular weight of the thus obtained fluorine-containing (meth)acryl type copolymer in the solution was determined using a gel-permeation chromatography. The molecular weight thereof was 7,000 in terms of polystyrene.

Next, 70 g of a solvent type alkyd resin (BECKOLITE M-6003-60; product by DAINIPPON INK AND CHEMICALS, INCORPORATED) and 30 g of a melamine resin (SUPER-BECKAMIN L-117-60, product by DAINIPPON INK AND CHEMICALS, INCORPORATED) were mixed for 5 minutes at a rotation speed of 2,000 rpm using Labodisper. To the thus obtained non-aqueous coating material, 0.1%, in terms of solid content, of the obtained solution containing fluorine-containing (meth)acryl type copolymer was added and then mixed for 5 minutes at a rotation speed of 2,000 rpm, obtaining a non-aqueous coating material,

COMPARATIVE EXAMPLE 4

150 parts by weight of xylene was introduced into a vessel fitted with a reflux condenser, thermometer, stirrer and dropping funnel, and the liquid inside the vessel was kept at 120° C. A mixed solution of 80 parts by weight of LIGHT ESTER M-3F (product by KYOEISHA CHEMICAL Co., Ltd.), 10 parts by weight of ethyl hexyl methacrylate, 10 parts by weight of butoxyethyl methacrylate and 1 part by weight of PERBUTYL D (product by NOF CORPORATION) was dropwise added into xylene under nitrogen over about 1 hour. Reaction was continued for 2 hours at 120° C., but reaction product became insoluble in xylene in the course of the reaction, being unable to obtain a solution containing fluorine-containing (meth)acryl type copolymer.

COMPARATIVE EXAMPLE 5

150 parts by weight of xylene was introduced into a vessel fitted with a reflux condenser, thermometer, stirrer and dropping funnel, and the liquid inside the vessel was kept at 120° C. A mixed solution of 50 parts by weight of ethyl hexyl methacrylate, 50 parts by weight of methoxy triethylene glycol methacrylate and 1 part by weight of PERBUTYL D (product by NOF CORPORATION) was dropwise added into xylene under nitrogen over about 1 hour. Reaction was continued for 2 hours at 120° C., obtaining a solution containing (meth)acryl type copolymer. Weight-average molecular weight of the thus obtained (meth)acryl type copolymer in the solution was determined using a gel-permeation chromatography. The molecular weight thereof was 11,000 in terms of polystyrene.

Next, a non-aqueous coating material was prepared according to Example 5 except that the thus obtained solution containing (meth)acryl type copolymer solution was used instead of the solution containing fluorine-containing (meth)acryl type copolymer in Example 5.

COMPARATIVE EXAMPLE 6

200 parts by weight of xylene was introduced into a vessel fitted with a reflux condenser, thermometer, stirrer and dropping funnel, and the liquid inside the vessel was kept at 110° C. A mixed solution of 20 parts by weight of lauryl methacrylate, 65 parts by weight of n-butylacrylate, 15 parts by weight of 2-hydroxyethyl acrylate and 5.0 parts by weight of PERBUTYL O (product by NOF CORPORATION) was dropwise added into xylene under nitrogen over about 1 hour. Reaction was continued for 2 hours at 110° C., obtaining a solution containing fluorine-containing (meth)acryl type copolymer. Weight-average molecular weight of the thus obtained fluorine-containing (meth)acryl type copolymer in the solution was determined using a gel-permeation chromatography. The molecular weight thereof was 7,000 in terms of polystyrene.

Next, a non-aqueous coating material was prepared according to Example 8 except that the thus obtained solution containing (meth)acryl type copolymer was used instead of the solution containing fluorine-containing (meth)acryl type copolymer in Example 8.

In order to examine properties of the non-aqueous type coating materials of Examples 5 to 8 and Comparative Examples 4 to 6, measurement of surface tension of coating materials and coated layers, evaluation of color separation prevention ability, evaluation of defoaming performance, leveling ability (existence or nonexistence of traces caused by a bar coater), measurement of contact angles of coating materials and evaluation of wettability to a substrate were carried out under the same condition previously described in the aqueous type coating materials.

In addition, a blank test and GLANOL test were carried out for comparison. As Blank C, a coating material was prepared according to Example 5 except that the solution containing fluorine-containing (meth)acryl type copolymer was not added. And as GLANOL sample C, a coating material was prepared according to Example 5 except that GLANOL 450 (product by KYOEISHA CHEMICAL Co., Ltd.) was used instead of the solution containing fluorine-containing (meth)acryl type copolymer solution. Measurement of surface tension of the coating materials and coated layers, evaluation of color separation prevention ability, defoaming performance and evaluation of leveling ability were carried out for the Blank and GLANOL samples.

Moreover, a blank and POLYFLOW tests were carried out to evaluate wettability to substrates. As Blank D, a coating material was prepared according to Example 8 except that the solution containing fluorine-containing (meth)acryl type copolymer solution was not added. As POLYFLOW B, a coating material was prepared according to Example 8 except that POLYFLOW KL 250 (product by KYOEISHA CHEMICAL Co., Ltd.), which is a 100% polyether modified silicone, was used instead of the solution containing fluorine-containing (meth)acryl type copolymer.

Blank and POLYFLOW B samples were subjected to such evaluations as measurement of surface tension of their coated layers as well as the coating materials, evaluation of contact angle of the coating materials and wettability to substrates. Results are shown in Tables 7 to 11.

TABLE 7

| | Surface Tension (•N/cm) | |
| --- | --- | --- |
| | Coated Layer | Coating Material |
| Example 5 | 37 | 26.8 |
| Example 6 | 36 | 26.3 |
| Example 7 | 37 | 26.6 |
| Example 8 | 31 | 22.1 |
| Comp. Example 4 | — | — |
| Comp. Example 5 | 36 | 27.3 |
| Comp. Example 6 | 30 | 29.2 |
| Blank C | 36 | 27.3 |
| Blank D | 31 | 29.5 |
| GLANOL B | 33 | 26.2 |
| POLYFLOW B | 29 | 28.8 |

TABLE 8

| | Color Separation Prevention Ability | | | |
| --- | --- | --- | --- | --- |
| | •L | •a | •b | •E |
| Example 5 | −0.07 | −0.05 | −0.13 | 0.15 |
| Blank C | −0.92 | 0.08 | 0.21 | 0.92 |

TABLE 9

| | Defoaming Ability (Time Period until Foam Disappears) |
|---|---|
| Example 6 | 10 seconds |
| Blank C | 280 seconds |

TABLE 10

| | Leveling Ability (Existence or Nonexistence of Traces Caused by Bar Coater) |
|---|---|
| Example 7 | Nonexistence |
| Blank C | Existence |

TABLE 11

| | Contact Angle of Coating Material on PTFE Board (°) | Wettability to Substrate |
|---|---|---|
| Example 8 | 22.2 | wet |
| Comp. Example 6 | 51.1 | no wet |
| Blank D | 52.2 | no wet |
| POLYFLOW B | 50.1 | no wet |

As seen from Tables 7 to 11, surface tension of the coating materials in Examples 5 to 7 was lowered when compared with that of comparative Examples 4, 5 and Blank test. But surface tension of the coated layers of Examples 5 to 7 was not lowered, and color separation prevention ability, defoaming ability and leveling ability thereof were improved.

The coating materials of Examples 5 to 7 have excellent properties as described above. Furthermore, lowering in surface tension of the coated layers, which was observed for the coated layer of the GLANOL sample, was not observed for Examples 5 to 7.

Surface tension of the coating material in Example 8 was lowered when compared with that of Comparative Example 6, Blank sample and POLYFLOW B sample. But surface tension of the coated layer of Example 8 was not lowered, and the contact angle of Example 8 on the PTFE board was lowered. Wettability to substrates thereof was also improved.

INDUSTRIAL APPLICABILITY

The surface tension control agent for coating materials of the present invention is effective in adjusting surface tension of a coated layer. A coating material containing the surface tension control agent gives a coated layer an excellent overcoatability and contamination resistance. In addition, the surface tension control agent for coating materials of the present invention provides coating materials with an excellent color separation prevention ability, antifoamability, leveling ability and wettability to substrates so that the surface tension control agent of the present invention can be used as a color separation prevention agent, defoaming agent, leveling improving agent and wettability improving agent.

What is claimed is:

1. A surface tension control agent for coating materials comprising:
    a fluorine-containing (meth)acryl type copolymer obtained by copolymerization of monomers consisting of:
    a fluorine-substituted alkyl (meth)acrylate monomer (A);
    n-butyl acrylate monomer or an alkyl (meth)acrylate monomer (B) having the alkyl group selected from the group consisting of lauryl and stearyl;
    a hydroxyl group- or ether group-substituted alkyl (meth)acrylate monomer (C); and
    optionally at least one kind of vinyl monomer (D) selected from the group consisting of styrene, alkyl vinyl ether, alpha-olefin and maleic anhydride,
    wherein the ratio of (A) to {(B)+(C)} in the copolymer is in the range of 3–60 parts by weight to 40–97 parts by weight.

2. The surface tension control agent according to claim 1, wherein the fluorine-containing (meth)acryl type copolymer is a copolymer obtained by copolymerization of monomers consisting of:
    the monomer (A);
    the monomer (B);
    the monomer (C); and
    the at least one kind of vinyl monomer (D).

3. The surface tension control agent according to claim 1, wherein a weight-average molecular weight of the fluorine-containing (meth)acrylate copolymer is in the range of 1,500–300,000.

4. The surface tension control agent according to claim 1, wherein the monomer (A) is an alkyl (meth)acrylate having a perfluoro alkyl group with 2–18 carbon atoms.

5. The surface tension control agent according to claim 1, wherein the copolymerization is block copolymerization.

6. The surface tension control agent according to claim 1, wherein the monomer (C) is at least one kind of a hyciroxyl group- or ether group-substituted alkyl (meth)acrylate represented by the following formula (1)

$$CH_2\!=\!C(R^1)\!-\!CO\!-\!O\!-\!A \qquad (1)$$

(where $R^1$ is hydrogen atom or methyl group; -A is a hydroxyl alkyl group with 2–4 carbon atoms or an alkyl substituent thereof, an alkyl monoalkylene glycol group having an alkyl group with 1–18 carbon atoms, an alkyl polyalkylene glycol group having an alkyl group with 1–18 carbon atoms, an alkenyl monoalkylene glycol group having an alkenyl group with 2–18 carbon atoms, or an alkenyl group-substituted polyalkylene glycol group having an alkenyl group with 2–18 carbon atoms).

7. A coating material comprising:
    a surface tension control agent for coating materials, which comprises a fluorine-containing (meth)acryl type copolymer obtained by copolymerization of monomers consisting of:
    a fluorine-substituted alkyl (meth)acrylate monomer (A);
    n-butyl acrylate monomer or an alkyl (meth)acrylate monomer (B) having the alkyl group selected from the group consisting of lauryl and stearyl;
    a hydroxyl group- or ether group-substituted alkyl (meth)acrylate monomer (C); and
    at least one kind of vinyl monomer (D) selected from the group consisting of styrene, alkyl vinyl ether, alpha-olefin and maleic anhydride,
    wherein the ratio of (A) to {(B)+(C)} in the copolymer is in the range of 3–60 parts by weight to 40–97 parts by weight.

8. The coating material according to claim 7, wherein the fluorine-containing (meth)acrylate type copolymer is a copolymer obtained by copolymerization of monomers consisting of:
- the monomer (A);
- the monomer (B);
- the monomer (C); and
- the at least one kind of vinyl monomer (D).

9. The coating material according to claim 7, wherein the weight-average molecular weight of the fluorine-containing (meth)acryl type copolymer is in the range of 1,500–300,000.

10. The coating material according to claim 7, wherein the monomer (A) is an alkyl (meth)acrylate having a perfluoroalkyl group with 2–18 carbon atoms.

11. The coating material according to claim 7, wherein the copolymerization is block copolymerization.

12. The coating material according to claim 7, wherein the monomer (C) is at least one kind of hydroxyl group- or ether group -substituted alkyl (meth)acrylate represented by the following formula (1)

$$CH_2\!=\!C(R^1)\!-\!CO\!-\!O\text{-}A \qquad (1)$$

(where $R^1$ is hydrogen atom or methyl group; -A is a hydroxy alkyl group with 2–4 carbon atoms or an alkyl substituent thereof, an alkyl monoalkylene glycol group having an alkyl group with 1–18 carbon atoms, an alkyl polyalkylene glycol group having an alkyl group with 1–18 carbon atoms, an alkenyl monoalkylene glycol group having an alkenyl group with 2–18 carbon atoms, or an alkenyl group-substituted polyalkylene glycol group having an alkenyl group with 2–18 carbon atoms).

13. The coating material according to claim 7, wherein the coating material further comprises an acrylic resin.

* * * * *